Figure 1:
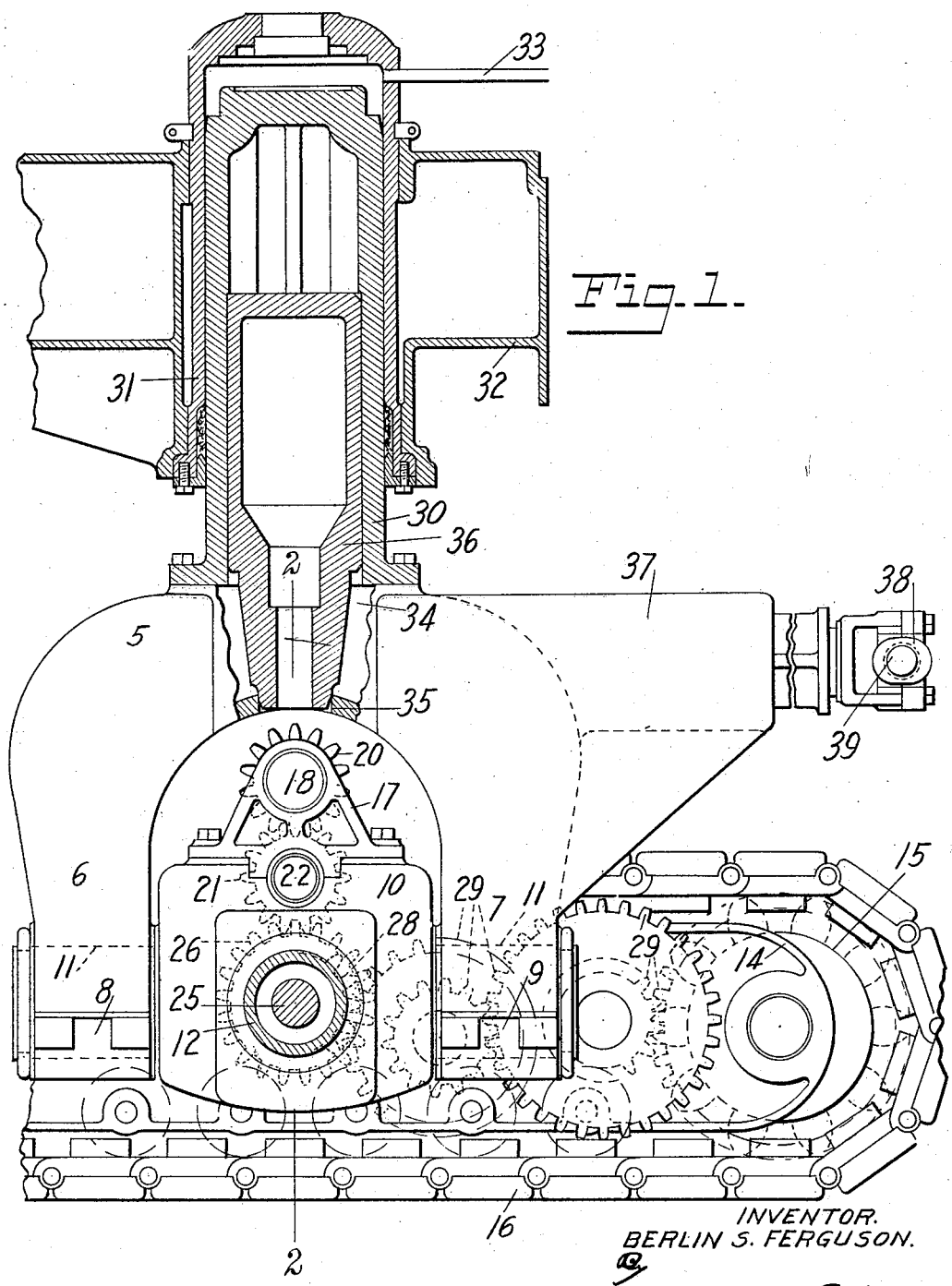

Nov. 11, 1930.  B. S. FERGUSON  1,781,170
CRAWLING TRACTION TRUCKS
Filed Oct. 1, 1927  2 Sheets-Sheet 2
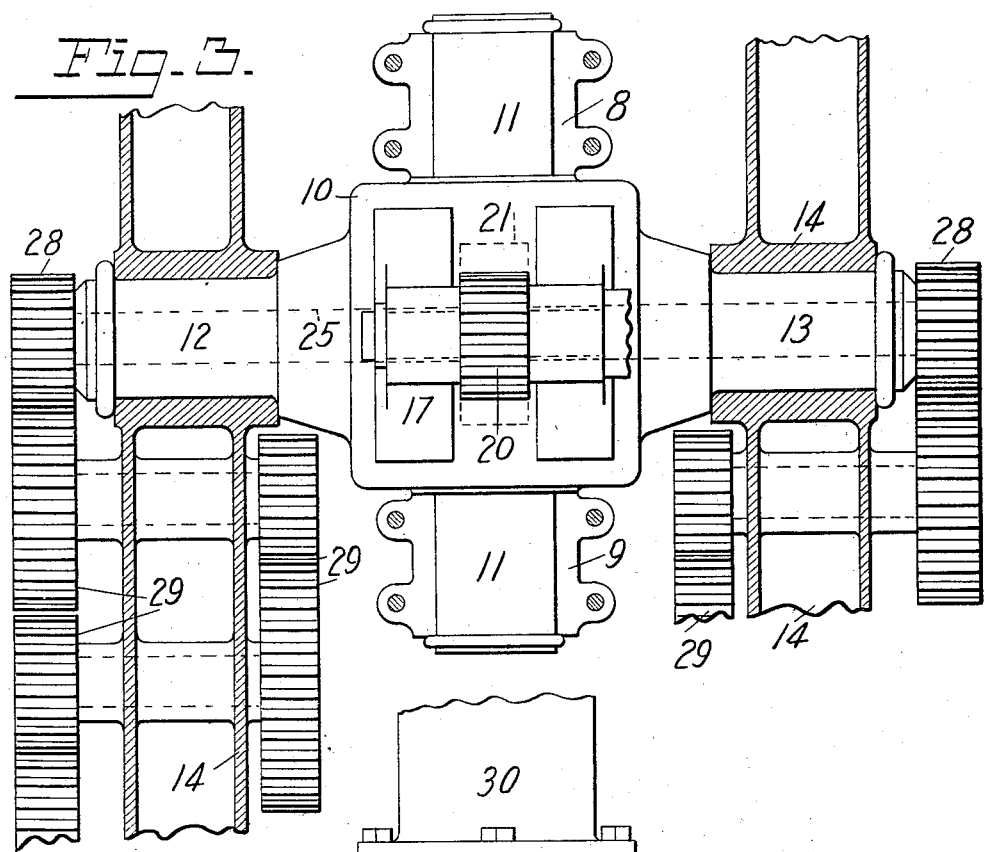
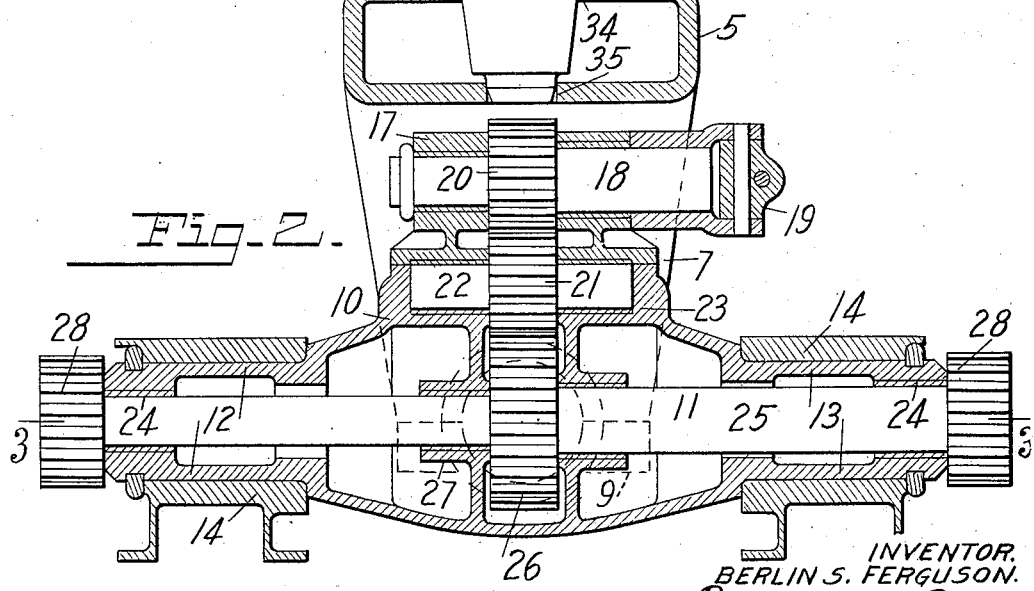
INVENTOR.
BERLIN S. FERGUSON.
ATTORNEY.

Patented Nov. 11, 1930

1,781,170

UNITED STATES PATENT OFFICE

BERLIN S. FERGUSON, OF MARION, OHIO, ASSIGNOR, BY MESNE ASSIGNMENTS, TO THE MARION STEAM SHOVEL COMPANY, (1927), OF MARION, OHIO, A CORPORATION OF OHIO

CRAWLING TRACTION TRUCK

Application filed October 1, 1927. Serial No. 223,416.

This invention relates to crawling traction trucks and is designed more particularly for use in connection with power shovels or other excavating machines of that type which is supported by a plurality of separate trucks. Such machines are often of great weight and inasmuch as they operate over surfaces which are irregular, and it is necessary for the trucks to accommodate themselves to the irregularities of the supporting surface, the trucks are frequently subjected to severe strains.

One object of the invention is to provide such a truck which will be simple in its construction, of a strong durable character and which will readily accommodate itself to the irregularities in the supporting surface.

A further object of the invention is to provide such a truck in which the actuating devices for the crawling traction elements will be mounted on one of the movable truck members and will be so arranged that they will not be affected by or their operation interfered with by the movements of the truck.

Other objects of the invention will appear as the mechanism is described in detail.

In the accompanying drawings Fig. 1 is a side elevation, partly broken away, of a truck embodying my invention; Fig. 2 is a transverse vertical section taken on the line 2—2 of Fig. 1; and Fig. 3 is a horizontal section taken on the line 3—3 of Fig. 2.

In these drawings I have illustrated one embodiment of my invention and have shown the same as designed for use with a propelling and steering mechanism such as is shown in my co-pending application filed October 1, 1927, Serial No. 223,415.

It will be understood, however, that this particular embodiment has been chosen for the purposes of illustration only and that the mechanism may take various forms without departing from the spirit of the invention.

In that particular embodiment here illustrated the truck comprises two frame members, one of which is pivotally mounted on the other for movement about a longitudinal axis and is provided with means whereby the crawling traction devices may be pivotally mounted thereon for movement about a transverse axis and, further, the truck as a whole is mounted for vertical movement and for movement about a vertical axis to permit steering movement to be imported thereto. As here shown, the truck comprises an upper frame member 5 which is provided with alined bearings. Preferably this upper frame member has depending arms 6 and 7 which give to the frame member substantially an inverted U-shape. The bearings 8 and 9 are formed in the lower portions of these depending arms. Mounted between the arms of the upper frame member is a lower frame member 10 which has longitudinally extending trunnions 11 journaled in bearings 8 and 9, respectively, so that this second or lower frame member may rock about a longitudinal axis. Preferably this second frame member is elongated transversely to the truck and is provided at the respective sides thereof with other trunnions 12 and 13, which extend transversely to the trunnions 8 and 9. Arranged on the respective sides of the truck are crawling traction devices which comprise longitudinal frame members 14 journaled between their ends, respectively, on the trunnions 12 and 13. Rotatably mounted on each frame member 14 and near the respective ends thereof are tumblers 15, one only of which is shown in Fig. 1, and extending about these tumblers is the usual endless track 16. It will be apparent, therefore, that the crawling traction devices or elements can have independent movement about a transverse axis to enable the same to tilt as they move over obstructions and that these crawling traction devices also have movement about a longitudinal axis to enable one to pass over a surface higher than that upon which the other is supported.

The second or lower frame member 10 has in its upper portion a transverse bearing 17 in which is mounted a shaft 18 adapted to be connected with a suitable driving mechanism, such, for example, as that shown in the above mentioned application, and which is here shown as provided with a universal connecting device 19. As here shown, the bearing 17 is divided into two parts which are spaced apart to receive between them a pinion 20 which is rigidly secured to the shaft 18 and which meshes with an idle pinion 21 carried by a shaft 22 journaled in bearings 23 carried by the lower frame member 10. Extending transversely through the lower frame member and journaled in bearings 24 in the trunnions 12 and 13 is a shaft 25 to which is secured a gear 26 which meshes with the idle gear 21. This shaft 25 is also supported by bearings 27 arranged in the central portion of the frame member adjacent to the respective sides of the gear 26. The shaft 25 projects beyond the respective trunnions 12 and 13 and has secured to the outer ends thereof gears 28 each of which meshes with one of the gears of a train of gears, shown at 29 in Fig. 1, which connects the shaft 25 with one of the tumblers 15 of the crawling traction device and thus causes the endless track 16 to travel about the frame member 14. It will be noted that this actuating mechanism is carried wholly by the lower frame member and that its arrangement is such that its operation will not be affected by any of the movements of this frame member. Further, it will be apparent that the several gears, 20, 21 and 26, are enclosed within the frame member, with the exception of the upper portion of the gear 20, thus protecting these gears from injury and excluding dirt and foreign matter therefrom.

Rigidly mounted upon the top of the upper frame member 5 is an upwardly extending plunger 30 which is slidably mounted in a cylinder 31 mounted in a frame 32 and adapted to contain a fluid to control the movement of the plunger. The cylinder is connected by a pipe 33 with the cylinders of the other trucks of the same machine and forms a part of an equalizing mechanism which permits the several trucks to have vertical movement with relation to the frame 32 and which serves to maintain that frame in a substantially horizontal position. In the present construction, the upper portion of the frame member 5 is hollow and has in the top wall thereof an opening 34 and in the lower wall thereof an opening 35 somewhat smaller than the opening 34. The plunger 30 is hollow and a member 36 is inserted in the same with a driving fit and has a reduced lower end portion which extends through the opening 34 in the frame member 5 and is seated at its lower end in the opening 35, thus reinforcing the plunger and bracing the same against the strains to which it is subjected. The plunger is of course capable of movement about a vertical axis in the cylinder, thereby permitting the truck as a whole to move about that vertical axis and in order that this movement may be imparted to the truck the frame member 5 has a longitudinally extending portion or arm 37 adapted to be connected with a suitable steering mechanism. As here shown, it is provided at its outer end with a nut 38 to receive a screw threaded steering shaft 39, such as is shown in the above mentioned application.

It will be apparent from the foregoing description that I have provided a truck of this kind which is very simple in its construction and which is of great strength, well adapted to resist the strains to which such a truck is subjected. Further, it will be apparent that the truck is of such a character that it will accommodate itself to any and all irregularities in the surface over which the truck is moving, the truck itself being capable of vertical movement and the crawling traction devices being capable of movement about both longitudinal and transverse axes. Further, the actuating devices for the endless belts of the crawling traction elements are mounted within one of the movable truck members where they are fully protected and are so arranged that they cannot be affected by any movement of the truck.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a crawling traction truck, a frame extending lengthwise of said truck and having depending parts arranged near the front and rear ends thereof and spaced apart, a second frame arranged between and pivotally mounted on said depending parts for movement about an axis extending lengthwise of said truck, and projecting laterally beyond the respective sides of the first mentioned frame, and crawling traction devices comprising frames pivotally mounted on the respective laterally projecting portions of said second frame for independent movement about a common axis transverse to the first mentioned axis.

2. In a crawling traction truck, a frame extending lengthwise of said truck and having depending parts arranged near the front and rear ends thereof and spaced apart, and having alined bearings, an enlongated frame arranged between said depending parts and having trunnions rigid therewith, extending transversely thereto and journaled in said bearings, said elongated frame having portions projecting on the opposite sides of the first mentioned frame and comprising alined trunnions, and crawling traction devices having frame members journaled on the respective last mentioned trunnions.

3. In a crawling traction truck, a frame having means for movably connecting the same with a structure to be supported by said truck and having depending parts near the front and rear ends thereof, said depending parts being spaced one from the other and having alined bearings, a second frame mounted between said depending parts, having trunnions journaled in said bearings and having other trunnions projecting beyond the respective sides of the first mentioned frame, and alined one with the other, and crawling traction devices on the respective sides of the first mentioned frame and comprising frame members journaled between their ends on the respective last mentioned trunnions.

4. In a crawling traction truck, a frame having depending arms spaced apart lengthwise of said truck and having alined bearings, a second frame extending transversely to the first mentioned frame and having its body portion mounted between said arms, said body portion having trunnions journaled in said bearings and having other trunnions extending beyond the respective sides of said first mentioned frame, and crawling traction devices having frame members journaled on the respective last mentioned trunnions.

5. In a crawling traction truck, a frame having alined bearings, a second frame having two pairs of trunnions rigidly connected therewith, the trunnions of each pair being in line one with the other, said trunnions being so arranged that the axis of one pair will substantially intersect the axis of the other pair, the trunnions of one pair being mounted in the bearings of the first mentioned frame, and crawling traction devices arranged on the opposite sides of said first mentioned frame and comprising frame members journaled on the trunnions of the other pair.

6. In a crawling traction truck, a frame having depending arms spaced apart lengthwise of said truck and having alined bearings, a plunger rigidly secured to and extending upwardly from said frame and mounted for vertical movement and for movement about a vertical axis, a second frame mounted between the arms, having trunnions journaled in said bearings and having other trunnions extending transversely to said truck, and crawling traction devices having frame members journaled on the respective last mentioned trunnions.

7. In a crawling traction truck, a frame having depending arms spaced apart lengthwise of said truck and having alined bearings, means for connecting said frame with a structure to be supported for movement about a vertical axis with relation to said structure, said frame also having a part extending lengthwise of said truck for moving the same about said vertical axis, a second frame mounted between said arms, having trunnions journaled in said bearings and having other trunnions extending transversely to said truck, and crawling traction devices having frame members journaled on the respective last mentioned trunnions.

8. In a crawling traction truck, a frame having depending arms provided with alined bearings and having a socket in the upper portion thereof, a plunger rigidly secured to said frame and having a part seated in said socket, a second frame mounted between said arms and having trunnions journaled in the respective bearings and having other trunnions extending transversely to the first mentioned trunnions, and crawling traction devices having frame members journaled on the respective last mentioned trunnions.

9. In a crawling traction truck, a frame having a hollow upper portion provided with openings in the upper and lower walls thereof and also having depending arms provided with bearings, a hollow plunger rigidly secured to said frame in line with said openings and having a part mounted therein, extending through said top wall and seated in the opening in said lower wall, a second frame mounted between said arms and having trunnions journaled in the respective bearings and having other trunnions extending transversely to the first mentioned trunnions, and crawling traction devices having frame members journaled on the respective last mentioned trunnions.

10. In a crawling traction truck, a frame having alined bearings, a second frame having trunnions journaled in said bearings and having other trunnions extending transversely to the first mentioned trunnions, crawling traction devices having frame members journaled on the respective last mentioned trunnions, a shaft journaled in said last mentioned trunnions, means for connecting said shaft with driving mechanism, and means for operatively connecting said shaft with said crawling traction devices.

11. In a crawling traction truck, a frame having alined bearings, a second frame having trunnions extending lengthwise of said truck and journaled in said bearings, said second frame being elongated transversely to said truck and having at its lateral ends trunnions, a shaft extending through said second frame and journaled in said trunnions, crawling traction devices having frame members journaled on the respective last mentioned trunnions, and means for operatively connecting said shaft with the respective crawling traction devices.

12. In a crawling traction truck, a substantially U-shaped frame member having its arms extending downwardly and provided near their lower ends with alined bearings, and having a rigid arm extending lengthwise of said truck, a second frame member mounted between said arms and having trunnions journaled in the respective bearings, said second frame having a hollow intermediate portion and having transversely extending trunnions at the respective sides thereof, a shaft extending through said second frame member and journaled in said transverse trunnions, crawling traction devices having frame members journaled on the last mentioned trunnions, a second shaft journaled in said second frame member, a gear train arranged in the hollow portion of said second frame member and operatively connecting said shafts, and means for operatively connecting the first mentioned shaft with the respective crawling traction devices.

13. In a crawling traction truck, a frame having a hollow upper portion provided with openings in the upper and lower walls thereof, a plunger rigidly secured to said frame in line with said openings and having a rigid part extending through the opening in the top wall of said frame and into the opening in the lower wall thereof, and crawling traction devices supporting said frame and mounted for tilting movement with relation thereto.

14. In a power driven crawling traction mechanism which comprises a structure to be supported and an equalizing device having a cylinder mounted on said structure and provided with means for connecting the same with another equalizing cylinder on said structure, an individual truck unit arranged directly below said equalizing cylinder for vertical bodily movement with relation to said structure and including a truck frame extending lengthwise of said truck unit, a crawling traction device having supporting connection with said truck frame and capable of tilting movement, and a plunger carried by said truck frame and movably mounted in said equalizing cylinder to control the vertical movement of said truck unit.

15. In a power driven crawling traction mechanism which comprises a structure to be supported and an equalizing device having a cylinder mounted on said structure and provided with means for connecting the same with another equalizing cylinder on said structure, an individual truck unit arranged directly below said equalizing cylinder for vertical bodily movement with relation to said structure and including a truck frame extending lengthwise of said truck unit, a crawling traction device having supporting connection with said truck frame and capable of tilting movement about both a transverse axis and a longitudinal axis, and a plunger rigidly secured to said truck frame and mounted in said equalizing cylinder for vertical movement to control the vertical bodily movement of said truck unit and for movement about a vertical axis to permit steering movement to be imparted to said truck unit.

16. In a power driven crawling traction mechanism which comprises a structure to be supported and an equalizing device having a cylinder mounted on said structure and provided with means for connecting the same with another equalizing cylinder on said structure, an individual truck unit arranged directly below said equalizing cylinder for vertical bodily movement with relation to said structure and including a truck frame extending lengthwise of said truck unit, a second frame pivotally mounted on said truck frame for movement about an axis extending lengthwise of said truck frame, crawling traction devices pivotally mounted on said second frame on opposite sides of said truck frame, and a plunger carried by said truck frame and mounted in said equalizing cylinder to control the vertical movement of said truck unit.

In testimony whereof, I affix my signature hereto.

BERLIN S. FERGUSON.